April 6, 1954  W. A. JOHNSON  2,674,029
TOOLHOLDER
Filed Sept. 4, 1951  2 Sheets-Sheet 1
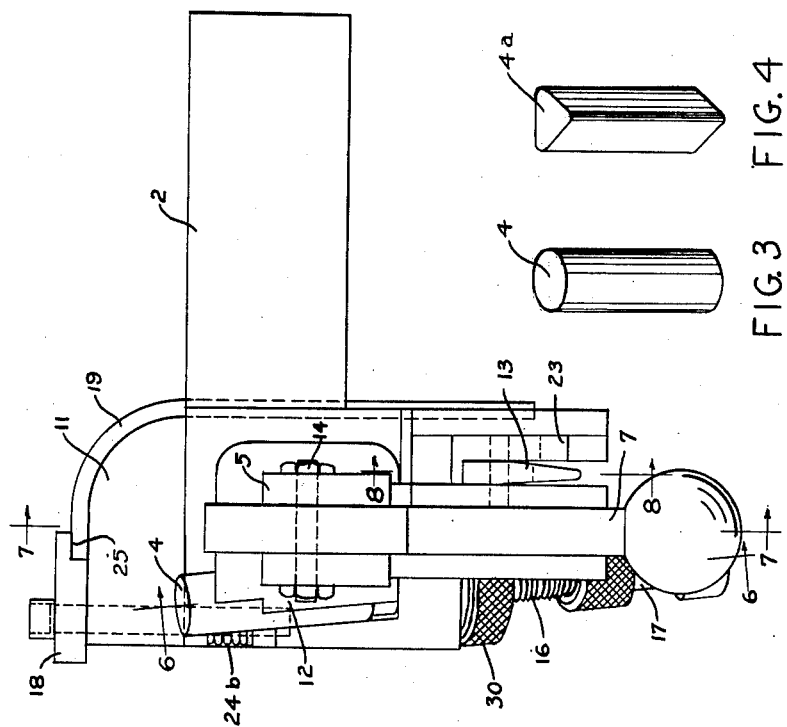
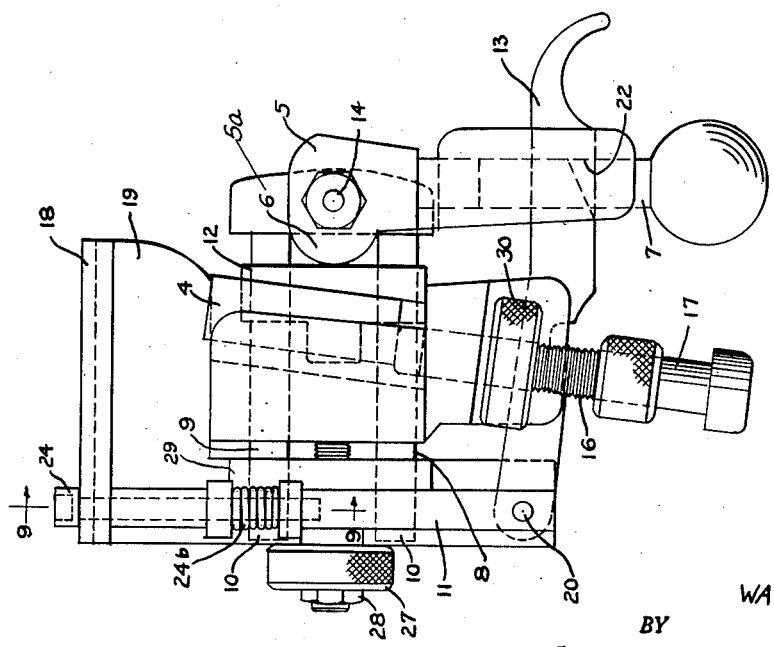
INVENTOR.
WAYNE A. JOHNSON
BY
Merrill M. Blackburn
ATTORNEY

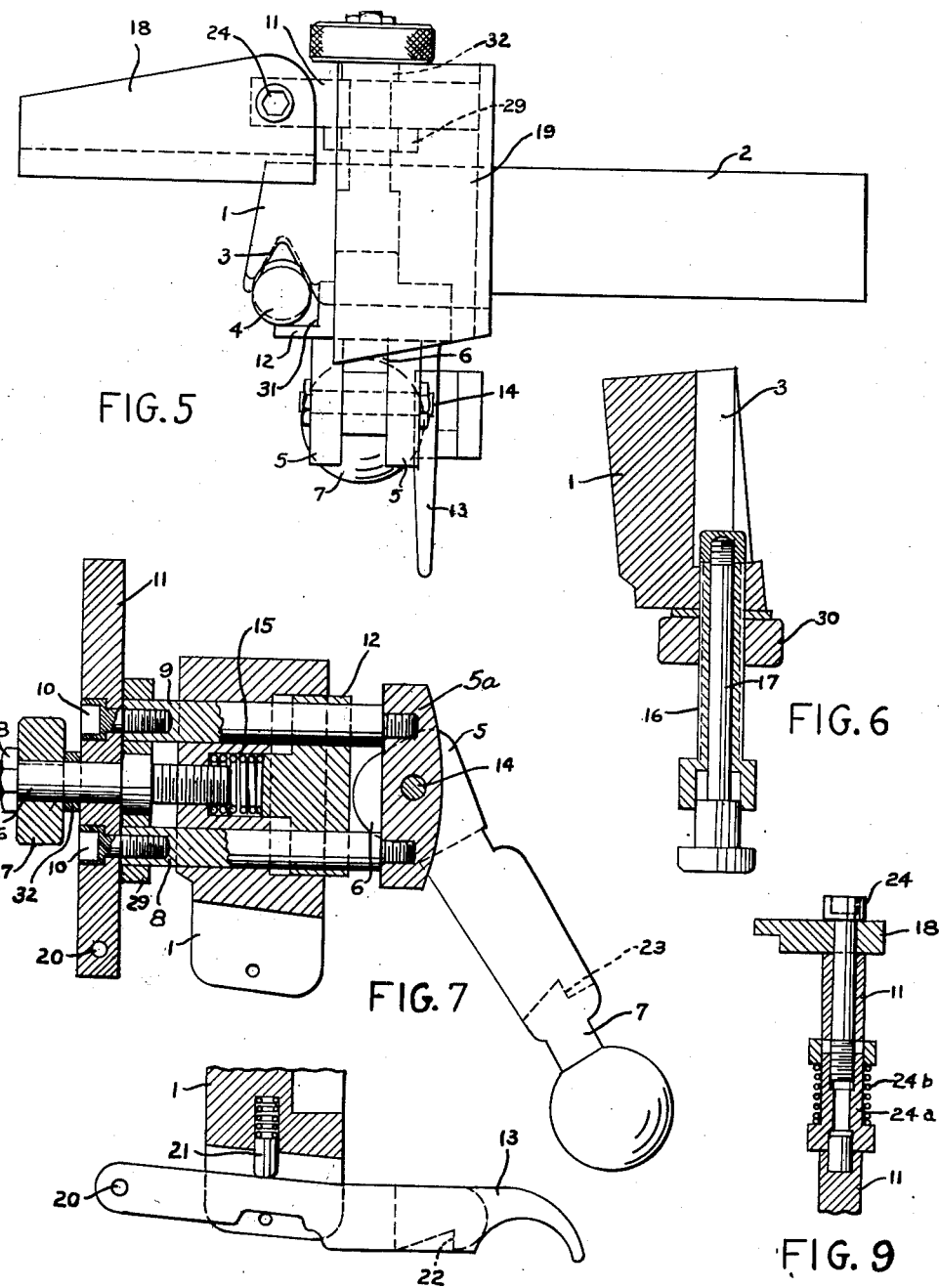

Patented Apr. 6, 1954

2,674,029

UNITED STATES PATENT OFFICE 2,674,029

TOOLHOLDER

Wayne A. Johnson, East Moline, Ill.

Application September 4, 1951, Serial No. 244,866

4 Claims. (Cl. 29—96)

The present invention relates to a tool holder for the cutting tool for machining the inclined faces of variable speed pulleys. Among the objects of this invention are the provision of a tool of such a character that the cutting tool may be quickly changed when necessary; the provision of a tool having a machining tool which can be rotationally or longitudinally adjusted with very little labor; the provision of a tool to be used on a lathe, having means for adjusting the cutting tool readily; the provision of a tool of the character described which may make use of a cutting tool of various designs; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 1 shows, in elevation, a structure embodying this invention;

Fig. 2 shows, in elevation, the same structure, at a right angle to the view shown in Fig. 1;

Figs. 3 and 4 show two forms of cutting unit in perspective;

Fig. 5 shows a plan view of the structure shown in Figs. 1 and 2;

Fig. 6 shows a section substantially along the plane indicated by the line 6—6 in Fig. 2;

Fig. 7 shows a section substantially along the plane indicated by the line 7—7 in Fig. 2;

Fig. 8 shows a section substantially along the plane indicated by the line 8—8 in Fig. 2; and Fig. 9 shows a section substantially along the plane indicated by the line 9—9 in Fig. 1.

Reference will now be made in greater detail to the annexed drawings for a more complete description of this invention, which comprises a block or body 1 provided with a shank 2 which is held in a lathe. This block is provided with a groove 3 for holding a tool 4 or 4a and has a pair of clamping plates 5, pivoted on a head 5a which clamping plates are made with eccentrics 6 formed on a lever 7. Tension members 8 and 9, as shown most clearly in Fig. 7, are secured by Allen bolts 10 to the back plate 11 of the housing of the cutting tool 4 or 4a. A tension device 12 is engaged by the eccentrics 6 and is caused to clamp the cutting tool 4 or 4a against undesired motion. The terms "cutting" and "machining" are used synonymously in this specification and the appended claims.

When it is desired to adjust the position of the cutting tool 4 or 4a, the lever 7 is released by releasing the triger control catch 13 by lifting it, and this releases the lever 7. This releases the cutting tool 4 or 4a so that it can be turned about its axis. When the lever 7 turns outwardly around the bolt 14, the eccentric 6 turns to release the tension device 12 which is pushed by spring 15 into tool-releasing position so that the cutting tool may be adjusted. The cutting tool is adjusted longitudinally by turning screw 16. It may be moved upwardly by turning the screw 16 up when lever 7 is released, and this pushes the cutting tool 4 or 4a upwardly. It may be adjusted rotationally by loosening the cutting tool, as above described, lifting it by the plunger 17, turning it, and again clamping it in place. When it is desired to reverse the cutting tool or put in a new one, the swinging section 18 is turned out, as shown in Fig. 5, the handle 7 is released and then the tool is taken hold of to be rotated or turned about to a new position.

The groove 3 has an inclination of, preferably, six degrees (6°) to get the cutting tool into proper position for machining the pulleys.

The trigger release catch 13 is pivotally mounted at 20 and is pressed downwardly by the spring-pressed plunger 21, as shown in Fig. 8. The notch 22 engages a corresponding notch 23 in the lever 7.

The swinging section 18 of the shield 19 is mounted on and pivotally held by a bolt 24 and, as shown in Fig. 2, is notched at 25 to overlap the edge of the shield 19.

The screw 24 is screwed into a stud 24a inside of the spring 24b which holds the swinging section 18 of the shield 19 immovable, or approximately so.

The back plate 11 has a stud 26 mounted therein and secured thereto by an adjusting knob 27 and lock-nut 28. A washer 29 holds the block 1 and back plate 11 separated and holds the studs 8 in position, and a washer 32 keeps the adjustable knob 27 out of engagement with the plate 11.

A lock-nut 30, as shown in Fig. 6, may be used to lock the sleeve 16 in desired position after adjusting the cutting tool 4 or 4a to the desired position longitudinally. The tension device 12 is notched, as shown at 31 in Fig. 5, to assist in holding the cutting tool 4 or 4a.

It is of course understood that the specific description of structure set forth above may be departed from without departing from the spirit of this invention as disclosed in this specification and as defined by the appended claims.

Having now described my invention, I claim:

1. In a machining tool for machining variable speed pulleys, a shank for supporting the tool, a body supported by the shank, a back plate outside of the body, an adjusting screw passing through the back plate and into the body, said screw being adjustable in relation to the body, securing adjustment between the back plate and the body, a spring-pressed tension member on the body, and a cutting tool between the tension member and the body, the spring-pressed tension member being pullable toward the body by said screw.

2. A tool holder comprising a back plate, a body member, means adjustably affixing said back plate to said body member, means on said body member to receive a tool, and means carried movably on said body member and connected with said back plate for clamping said tool to said tool-receiving means, said clamping means being adjustable relative to said body member when said back plate is adjusted.

3. A tool holder comprising a body member, means thereon to receive a tool, a back plate, a pair of tension members affixed in spaced-apart relation to said back plate, apertures in said body member to slidably receive said tension members, means carried by said back plate and adjustably connected with said body member for adjusting the position of the latter relative to said back plate, a head affixed to said tension members at the ends thereof opposite the ends that are affixed to said back plate, a tool clamping part slidable on said tension members between said head and said body member, and clamping means carried by said head and engageable with said tool-clamping part affixing said tool to said body member.

4. In a machining tool, a supporting body, a back plate outside the body, an adjusting screw passing through the back plate and into the body, said screw being adjustable in relation to the body, means releasably locking the screw to the back plate, releasing said latter means and turning said screw securing adjustment between the back plate and the body, a spring pressed tension member movably mounted on the body and normally urged to move away from the latter, and means for rotating said screw to pull the tension member toward said supporting body.

References Cited in the file of this patent

UNITED STATES PATENTS

| Number | Name | Date |
|---|---|---|
| 1,121,101 | Hersee | Dec. 15, 1914 |
| 1,478,967 | Lee | Dec. 25, 1923 |
| 1,732,445 | La Pointe | Oct. 22, 1929 |
| 2,386,652 | Borg | Oct. 9, 1945 |
| 2,499,529 | Schlitters | Mar. 7, 1950 |